United States Patent
Trantham

(10) Patent No.: US 7,043,567 B2
(45) Date of Patent: May 9, 2006

(54) METHOD AND APPARATUS FOR DETERMINING THE ORDER OF EXECUTION OF QUEUED COMMANDS IN A DATA STORAGE SYSTEM

(75) Inventor: Jon D. Trantham, Chanhassen, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 580 days.

(21) Appl. No.: 10/327,543

(22) Filed: Dec. 20, 2002

(65) Prior Publication Data

US 2004/0015653 A1 Jan. 22, 2004

Related U.S. Application Data

(60) Provisional application No. 60/397,706, filed on Jul. 22, 2002.

(51) Int. Cl.
*G06F 12/00* (2006.01)
(52) U.S. Cl. .......................................... 710/6; 711/113
(58) Field of Classification Search ................. None
See application file for complete search history.

(56) References Cited

U.S. PATENT DOCUMENTS

| | | | | |
|---|---|---|---|---|
| 3,623,006 A | | 11/1971 | Balakian | 340/172.5 |
| 3,629,860 A | | 12/1971 | Capozzi | 340/172.5 |
| 4,232,365 A | | 11/1980 | Englund | 364/200 |
| 4,583,166 A | | 4/1986 | Hartung et al. | 364/200 |
| 5,140,683 A | | 8/1992 | Gallo et al. | 395/425 |
| 5,220,653 A | * | 6/1993 | Miro | 718/107 |
| 5,548,795 A | * | 8/1996 | Au | 710/52 |
| 5,570,332 A | | 10/1996 | Heath et al. | 369/50 |
| 5,664,143 A | | 9/1997 | Olbrich | 711/112 |
| 5,729,718 A | * | 3/1998 | Au | 711/167 |
| 5,914,916 A | * | 6/1999 | Totsuka et al. | 369/30.1 |
| 6,170,042 B1 | | 1/2001 | Gaertner et al. | 711/158 |
| 6,418,510 B1 | | 7/2002 | Lamberts | 711/113 |
| 6,442,658 B1 | | 8/2002 | Hunt et al. | 711/158 |
| 6,571,298 B1 | * | 5/2003 | Megiddo | 710/5 |
| 6,574,676 B1 | * | 6/2003 | Megiddo | 710/5 |

OTHER PUBLICATIONS

Gallo et al. "Hamiltonian Paths Algorithms for Disk Scheduling", Tichnical Report 20/94, Dipartimento di Informatica, University of Pisa, 1994.*
Andrews et al. "New Algorithms for the Disk Scheduling Problem", Proc. IEEE Symp. Foundations of Computer Science, pp. 550-559, Oct. 1996.*
Andrews, Matthew "Scheduling Techniques for Packet Routing, Load Balancing and Disk Scheduling" 1997, MIT Press Doctoral Thesis.*

* cited by examiner

*Primary Examiner*—Mano Padmanabhan
*Assistant Examiner*—Paul Baker
(74) *Attorney, Agent, or Firm*—Westman, Champlin & Kelly, P.A.

(57) ABSTRACT

A method of determining an order of execution of a plurality of queued commands in a data storage system includes the step of determining a execution path metrics for each of a plurality of commands in a waiting queue. Each execution path metrics is determined both as a function of an access time between a last command in a ready queue and the associated command in the waiting queue, and as a function of an access time between the associated one of the commands in the waiting queue and another of the commands in the waiting queue. Based upon the determined execution path metrics, one of the commands in the waiting queue is selected and moved from the waiting queue to the ready queue. Also disclosed is a data storage system configured to implement the method.

12 Claims, 12 Drawing Sheets

METHOD AND APPARATUS FOR DETERMINING THE ORDER OF EXECUTION OF QUEUED COMMANDS IN A DATA STORAGE SYSTEM

CROSS-REFERENCE TO RELATED APPLICATION

This application claims priority from U.S. Provisional Application No. 60/397,706 filed on Jul. 22, 2002 for inventors Jon D. Trantham and entitled ALGORITHM FOR DETERMINING THE ORDER OF EXECUTION OF QUEUED COMMANDS IN A ROTATING DISK DRIVE.

FIELD OF THE INVENTION

The present invention relates generally to data storage systems, and more particularly but not by limitation to methods and apparatus for determining the order of execution of queued commands.

BACKGROUND OF THE INVENTION

Computers and other types of host systems read and write data to data storage devices such as disc drives. The process of reading data from or writing data to a specific media location is initiated by the host system or device which issues a command across a bus using a defined protocol. Some interface protocols, such as the small computer system interface (SCSI) protocol, allow multiple commands to be queued at the disc drive. In other words, a read or write command can be issued to the disc drive and placed in queue without having to wait for the execution of any outstanding commands to be completed.

Embodiments of the present invention offer advantages which can be useful in data storage systems which queue commands.

SUMMARY OF THE INVENTION

A method of determining an order of execution of a plurality of queued commands in a data storage system includes the step of determining a execution path metrics for each of a plurality of commands in a waiting queue. In some embodiments, each execution path metrics is determined both as a function of an access time between a last command in a ready queue and the associated command in the waiting queue, and as a function of an access time between the associated one of the commands in the waiting queue and another of the commands in the waiting queue. Based upon the determined execution path metrics, one of the commands in the waiting queue is selected and moved from the waiting queue to the ready queue. Also disclosed is a data storage system configured to implement the method.

Other features and benefits that characterize embodiments of the present invention will be apparent upon reading the following detailed description and review of the associated drawings.

BRIEF DESCRIPTION OF THE DRAWINGS

FIGS. 5, 6-1 and 6-2 are flow diagrams illustrating methods of the present invention in varying detail.

DETAILED DESCRIPTION OF ILLUSTRATIVE EMBODIMENTS

Figure 1:
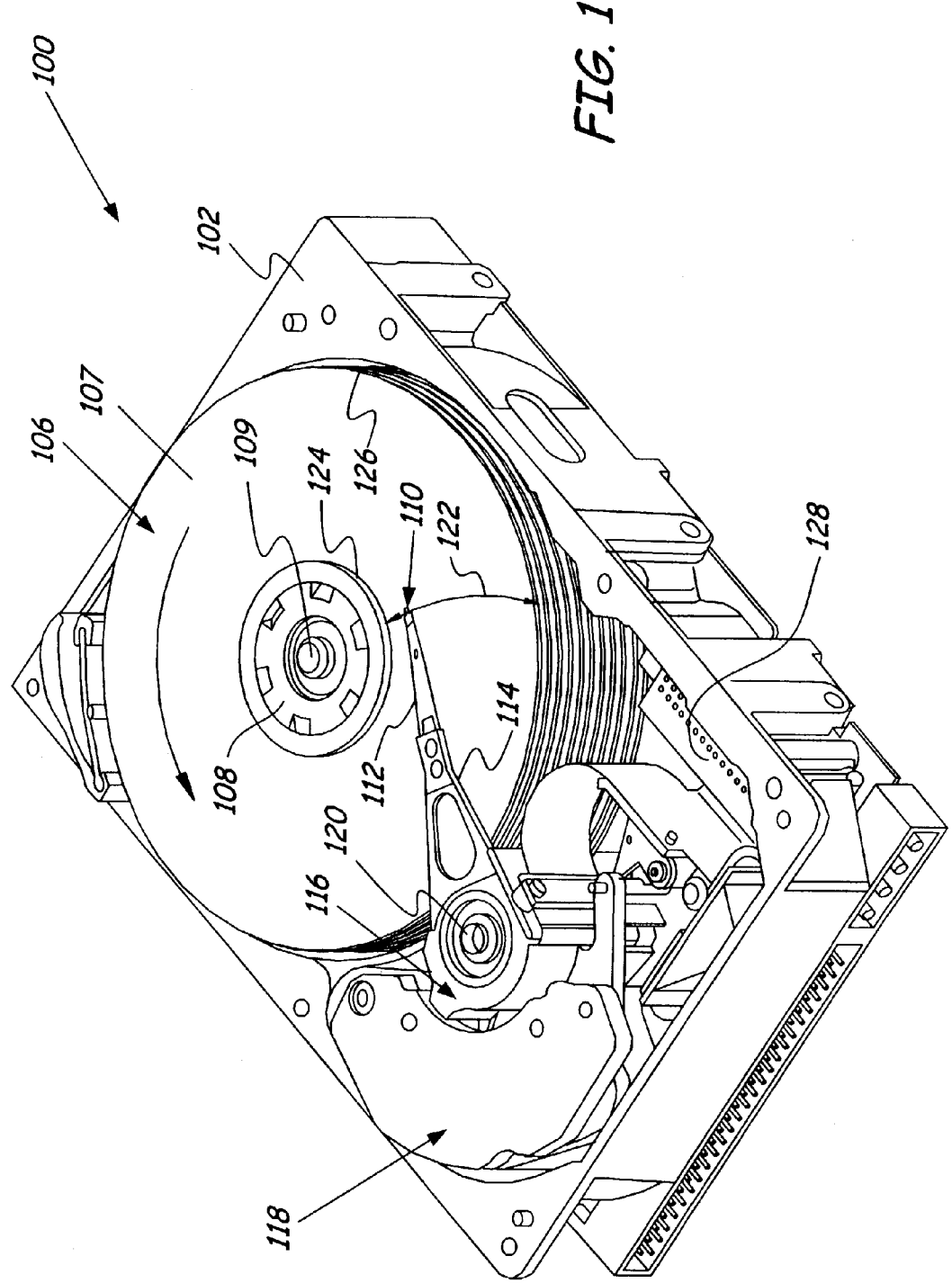
FIG. 1 is an isometric view of a disc drive.

FIG. 1 is an isometric view of a disc drive 100 in which embodiments of the present invention are useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation about central axis 109. Each disc surface 107 has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics based on signals generated by heads 110. A controller (shown in FIG. 2) of disc drive 100 maintains queues of commands to be executed and controls the servo electronics, data heads, read channels and other components in order to execute those commands. Disc drive 100 is can be a high performance disc drive, such as an Enterprise Disc Drive. However disc drive 100 can be comprised of any number of media discs, or can be any type of disc drive.

Typically, firmware of disc drives are adapted to execute the commands in an order which is deemed most appropriate based upon the types of commands in the queue. Generally, the firmware can change the order of execution of commands (with some limitations) in order to maximize the number of commands serviced in a given period. Intelligent disc controller firmware sorts the commands, using any of a variety of different sorting algorithms, in order to reduce mechanical delays within the drive. Mechanical delays include the times required to seek and to spin to the beginning of a block of data associated with the command. Proper sorting of queued commands can dramatically improve the performance of a disc drive data storage system by reducing these mechanical delays. Reducing these delays can be even more significant in Enterprise disc drives or other high capacity disc drives which function as servers. These types of drives can experience a very high number of commands in a short period of time.

In some embodiments, queue sorting algorithms schedule the next command to execute from a waiting queue by finding the command with the shortest access time from the tail end of the last command slated for execution. Once this command is identified, it is moved to a ready queue, where it awaits sequential execution by the drive. While this aids in reducing the mechanical delays associated with the execution of a queue of commands, further improvement in this area can be achieved. Embodiments of the invention disclosed herein provide such further improvement.

Figure 2:
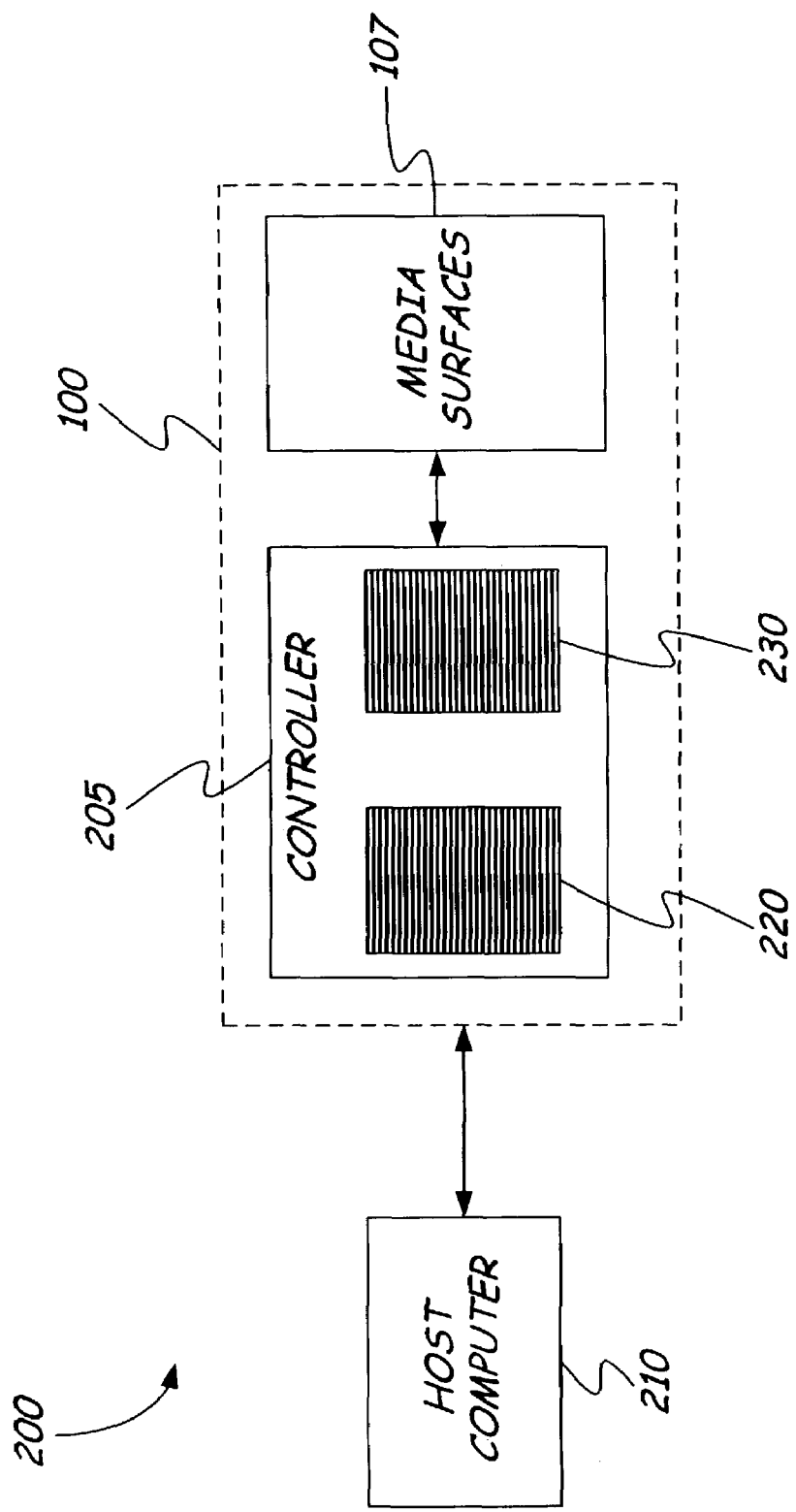
FIG. 2 is a block diagram illustrating portions of a computing environment in which the methods of the present invention are particularly well suited.

FIG. 2 is a diagrammatic illustration of an exemplary computing environment 200 in which the present invention is particularly useful. Computing environment 200 is comprised of a host computer 210 and a disc drive 100 as shown in FIG. 1. Disc drive 100 is shown diagrammatically, with only a controller 205 and the media surfaces 107 represented. Other components of disc drive 100 can be as shown in FIG. 1. Host computer 210 represents any device capable of relaying or issuing commands to a drive, such as a file-server, a disk array controller, or a stand-alone computer. Host computer 210 issues commands to disc drive 100 causing controller 205 to execute those commands. Those commands are stored in a waiting queue 220 and a ready queue 230 associated with controller 205. Controller 205 can be one or more processors, microcontrollers, firmware or other circuitry which controls the execution of commands. As such, controller 205 includes memory, associated with the control circuitry, in which queues 220 and 230 are implemented. Waiting queue 220 hold commands which can be re-ordered for execution in order to improve performance. Ready queue 230 holds commands which will be executed sequentially. Once a command is moved from waiting queue 220 into ready queue 230, its execution order is ordinarily not changed.

Figure 3:
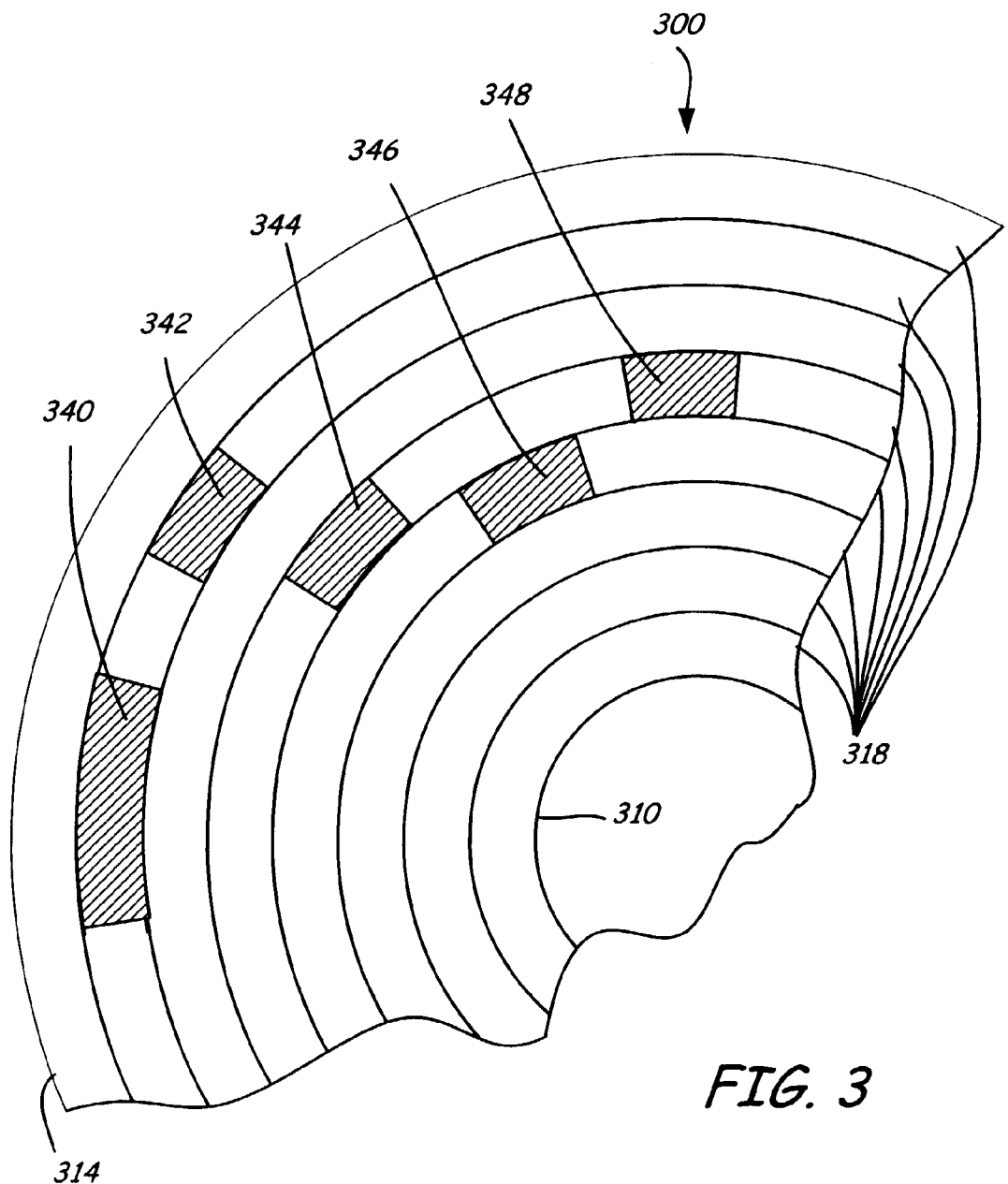
FIGS. 3 and 4 are diagrammatic illustrations of a portion of media disc of a disc drive illustrating a series of commands to be executed, as well as concepts of the present invention.

FIG. 3 illustrates a portion of storage media disc 300 which represents one of the disc surfaces 107 in disc stack 106 discussed in FIG. 1. Disc 300 comprises a hub 310, a disc edge 314 and multiple tracks 318. Tracks 318 are disposed between hub 310 and disc edge 314. Further, tracks 318 are configured such that they extend circumferentially around hub 310 and are parallel to each other. Tracks 318 contain data blocks 340, 342, 344, 346, 348, or are capable of containing or storing the data blocks. Each data block 340, 342, 344, 346, 348 represents information or data that is stored or to be stored in one or more contiguous or nearly-contiguous sectors on the storage media disc 300. Further each block 340, 342, 344, 346, 348 has an associated command to either read or write the associated block. This data can include information such as part or all of word processing documents, application programs, instructions to perform a specific task, etc. However other information can be stored in blocks 340, 342, 344, 346, 348. For purposes of this discussion the word command means a "command" from a host computer to access (read) an associated data block location on disc 300, or a command from the host computer to store (write) an associated data block on disc 300, for the purposes of reading or writing data to that particular block.

Figure 4:
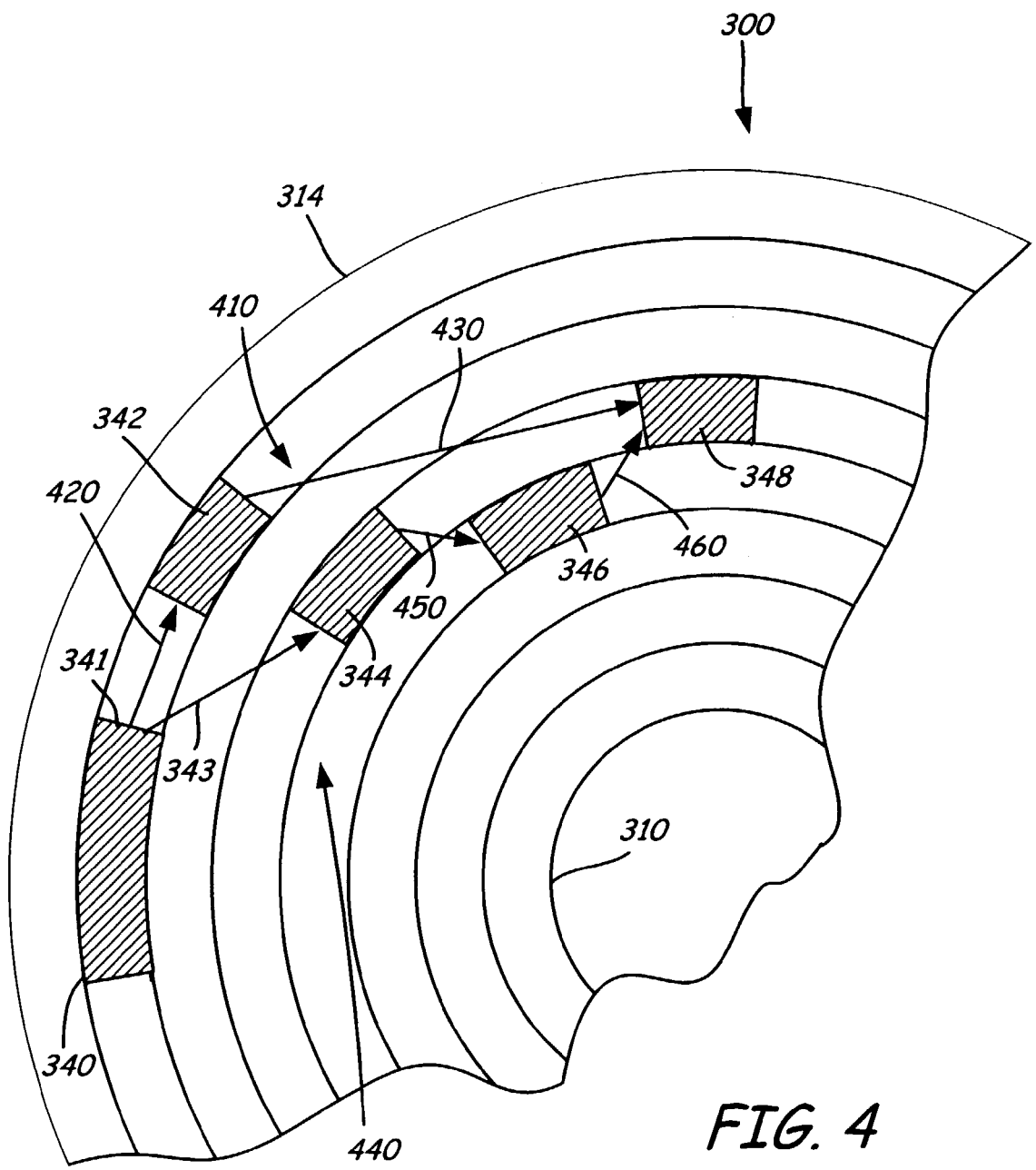

FIG. 4 illustrates a portion of storage media disc 300 with two exemplary command stream execution orders for commands stored in queues for execution by disc drive firmware or other controller circuitry. The arrangement illustrated in FIG. 4 is similar to the arrangement illustrated in FIG. 3, and reference numbers used in FIG. 4 are the same as reference numbers used in FIG. 3 identify the same or similar features. FIG. 4 shows two command streams 410 (containing command 342 followed by 348) and 440 (containing command 344, followed by command 346, followed by command 348) illustrating two different execution orders of the commands that are executed by the disc drive. It should be noted that FIG. 4 illustrates those command streams that can be accessed during one revolution of the disc. For purposes of describing the methods of the present invention, the commands are illustrated as data blocks to be read from the media surface(s) and/or data blocks to be written to the media surface(s). Although the data blocks are illustrated with reference to a single media surface, those skilled in the art will recognize that the commands can correspond to data blocks on different media surfaces provided by different discs of the stack.

Command 340 shown in FIG. 4 represents the last command in the ready queue, and commands 342, 344, 346, and 348 represent commands in the waiting queue waiting to be passed to the ready queue. Command stream 410 illustrates the path one prior art queue sorting algorithm would select for executing the commands. As shown at arrow 420, the prior art queue sorting algorithm selects command 342 for passing to the ready queue 230 because it has the shortest access time from end 341 of command 340. Following the selection of command 342 to be moved to the ready queue, the prior art algorithm considers the next command having the shortest access time to the last command in the ready queue, command 342. By way of example, assume that the prior art algorithm selects command 348 as the next command because it is the command that has the shortest access time to command 342 as shown by arrow 430. For purposes of discussion, it is assumed that commands 344 and 346 are not selected because, due to physical limitations of the drive, they have longer access times caused by the need for additional disc rotations to move between tracks. In other words, the prior art queue sorting algorithm considers each accessing command a single event, and moves to the next closest event following completion of the current command.

In accordance with the present invention, it has been discovered that the performance of a disc drive can be improved by considering not only the access time of the "next command", but by also considering any subsequent commands that follow the "next command" when determining which command to next move from the waiting queue to the ready queue. Command stream 440 illustrates how an algorithm, according to one embodiment of the present invention, increases the disc drive's efficiency. The queue sorting algorithm of the present invention considers future commands in the waiting queue when determining the next command to move to the ready queue.

Continuing with the example shown in FIG. 4 where command 340 is currently the last command in the ready queue. The queue sorting algorithm of the present invention identifies a number of commands in the waiting queue having shortest access times relative to the end of command 340. In one example, the algorithm determines that commands 342 and 344 are the two closest commands based on access time to command 340. These are shown by arrows 420 and 343. However, the algorithm of the present invention further determines that the closest accessible command based on access time and drive characteristics to command 342 is command 348, as identified by arrow 430 of command stream 410. Command stream 410 could potentially result in three commands 340, 342, and 348 executing during one rotation.

Rather than selecting command stream 410 based upon the fact that command 342 has less latency relative to command 340 than does command 344, the algorithm of the present invention considers which command(s) have the shortest access time from the end of commands 342 and 344. For example, assume that the algorithm determines that the closest command to command 344 is command 346 as shown by arrow 450. The algorithm also determines that following command 346, command 348 has the shortest access time as shown by arrow 460. This results in command stream 440 represented by arrows 343, 450 and 460. Using command stream 440, four commands 340, 344, 346 and 348 could potentially be executed during one rotation. Thus, command 344 is a better candidate for moving from the waiting queue to the ready queue than is command 342.

The algorithm according to one embodiment of the present invention also considers commands 346 and 348 as potential next commands to execute after command 340. However, the command streams that would result from these commands are no better than command stream 440, and therefore these paths would not be selected. By considering future commands in the waiting queue to be executed when selecting a next command to schedule (by moving it from the waiting queue to the ready queue), the algorithm of the present invention chooses to move command 344 to the ready queue instead of command 342 despite its longer access time, because a larger number of commands in the queue can be executed in the same rotation by following the path indicated by command stream 440.

Figure 5:
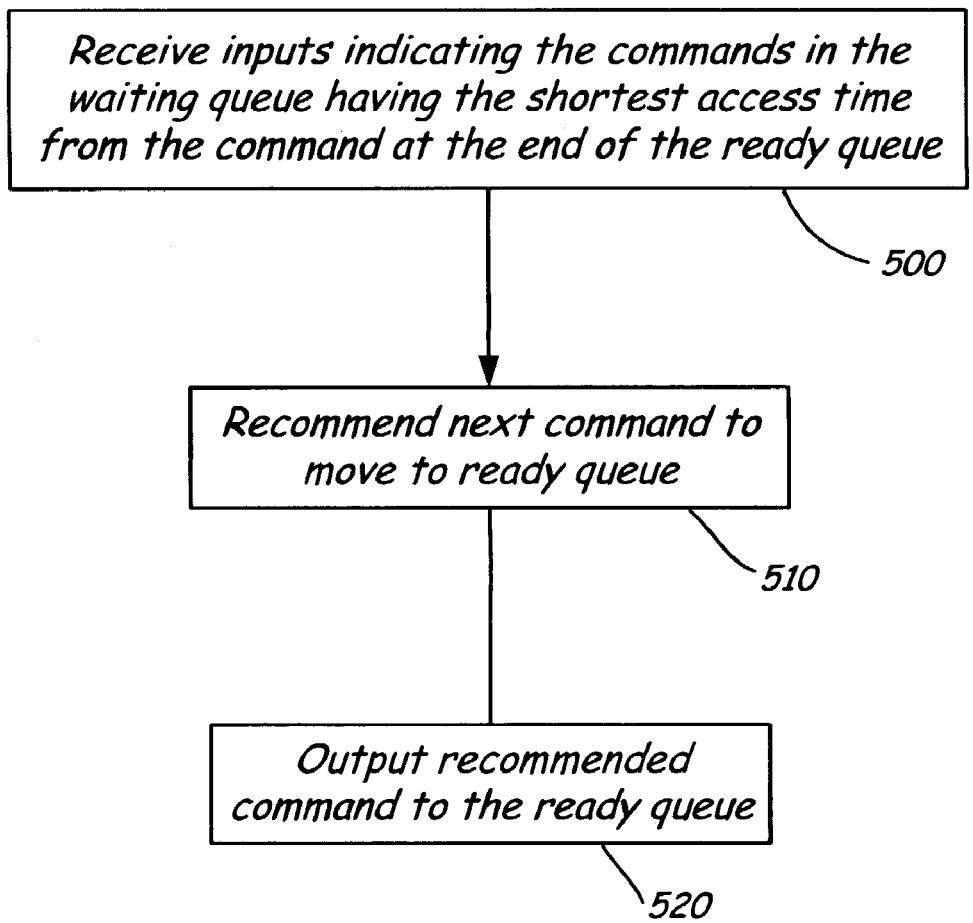

FIG. 5 is a simplified flow diagram illustrating the steps executed by a find_next_command routine according to the teachings of the present invention. At step 500, the find next command routine receives inputs from an array table. This array table can be stored in memory associated with the controller 205 and contains a number of commands having the shortest access times from the command at the end of the ready queue. In one embodiment these commands are presented in order of the shortest to highest access times. The array table also contains the access times between all of the commands in the waiting queue, with the eight shortest access times from each command sorted. An example array table showing four commands is illustrated in Table 1.

TABLE 1

| ACCESS TIMES FROM THE END OF READY QUEUE TO THE COMMANDS IN WAITING QUEUE | | | | |
|---|---|---|---|---|
| | C0 | C1 | C2 | C3 |
| R | 212 | 326 | 242 | 412 |
| ORDER OF THE ABOVE | | | | |
| Ro | 0 | 2 | 1 | 3 |
| ARRAY OF ACCESS TIMES BETWEEN WAITING QUEUE COMMANDS | | | | |
| C0 | * | 220 | 312 | 260 |
| C1 | 160 | * | 328 | 330 |
| C2 | 320 | 190 | * | 231 |
| C3 | 271 | 142 | 177 | * |
| ORDER OF THE TOP ACCESS TIMES FOR EACH COMMAND | | | | |
| C0 | 1 | 3 | 2 | 0 |
| C1 | 0 | 2 | 3 | 1 |
| C2 | 1 | 3 | 0 | 2 |
| C3 | 1 | 2 | 0 | 3 |

Where C0, C1, C2, and C3 are four commands having the shortest access times from the end of the last command in ready queue; R is the access time for the commands; and R0 is the access time order from shortest to longest. Also shown in Table 1 are two additional arrays illustrating the access time between the commands in the waiting queue, and the order of the commands, where 0, 1, 2, and 3 represent the associated command.

Referring back to FIG. 5, at step 510, the selection algorithm recommends a next command to move to the ready queue. The process used by the selection algorithm to determine which command to move to the ready queue will be discussed in further detail later. According to one exemplary embodiment of the present invention, the selection algorithm considers 16–64 potential paths through the commands in the waiting queue. However more or less potential paths can be used depending on the needs of the drive and the processing capabilities of the controller or system. The selection algorithm selects, for the recommended next command to move to the ready queue, the command whose path has the best probability of having the shortest access times between subsequent commands. In one exemplary embodiment the algorithm selects as the recommended command the command whose access time sum corresponding to its command stream is the lowest. However other methods of determining the recommended command can be used. Discussion of the execution metrics used in making this determination is provided below.

At step 520, the find_next_command routine or algorithm moves the recommended command from the waiting queue to the ready queue.

Figures 1, 6:
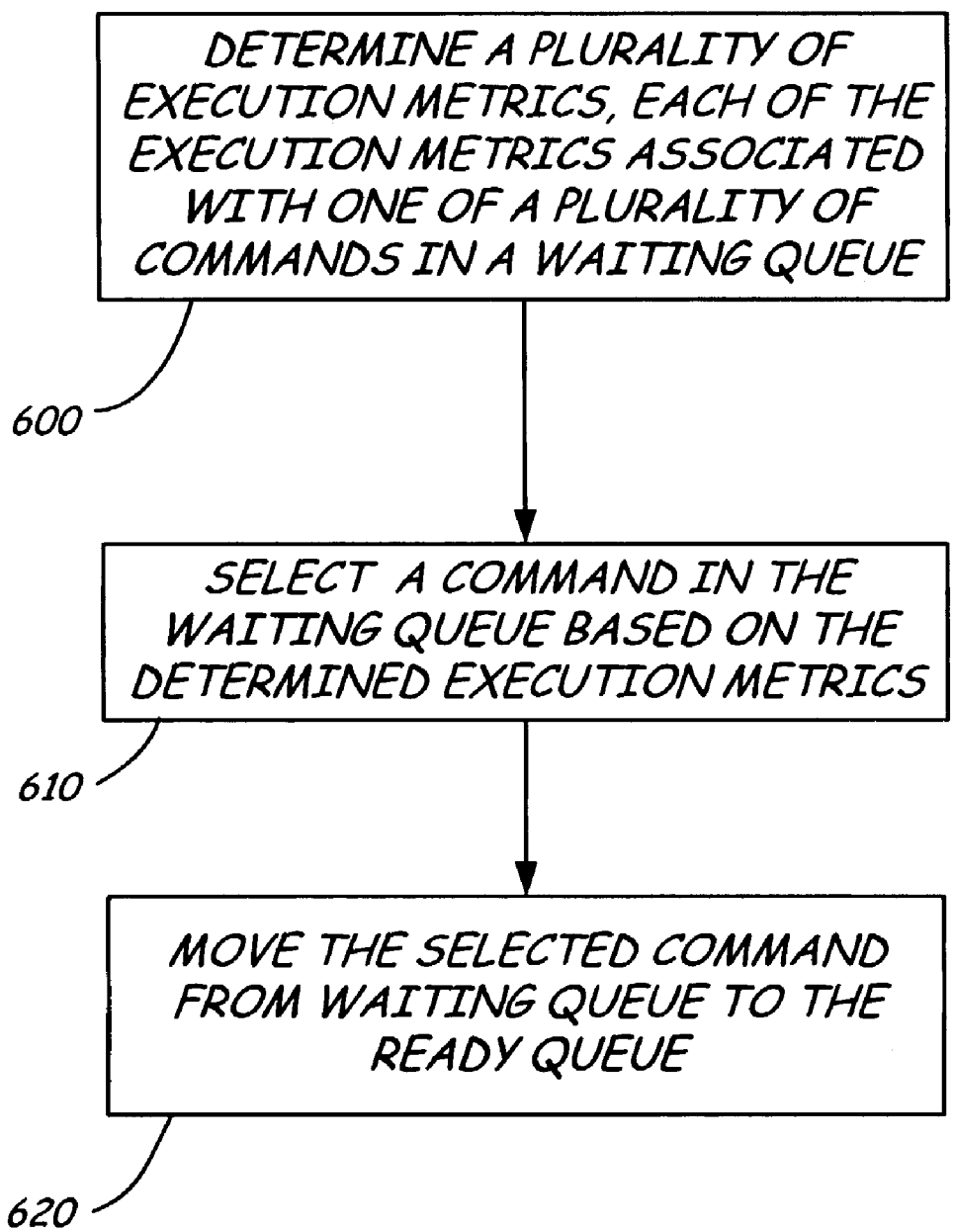
Figures 2, 6:
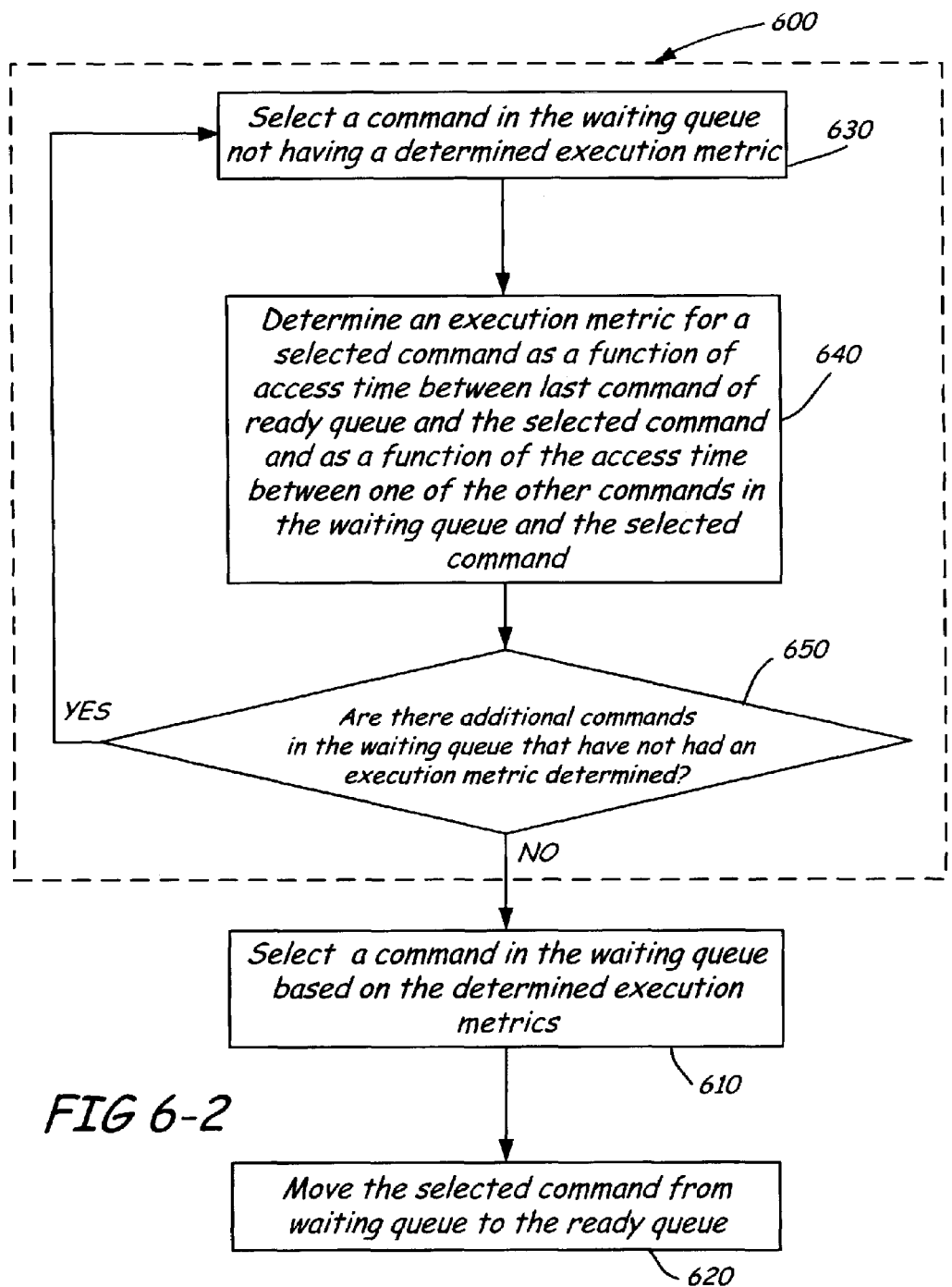

FIG. 6-1 is a flow chart illustrating steps for determining which of the queued commands to move to the ready queue. At step 600, a plurality of execution metrics is determined. Each of the plurality of execution metrics are associated with one of the plurality of commands in waiting queue 220, but each command can be associated with multiple execution metrics. Each of the execution metrics is determined both as a function of an access time between a last command in the ready queue 230 and the associated one of the commands in the waiting queue. Also, each of the execution metrics is further calculated as a function of access time between the associated command in the waiting queue and another of the commands in the waiting queue. At step 610, one of the commands in the waiting queue is selected based upon the determined execution metrics. At step 620, the selected one of the commands in the waiting queue is moved to the ready queue.

FIG. 6-2 is a flow chart illustrating in more detail the sub-steps performed at step 600 in FIG. 6-1 in example embodiments. Step 600 includes three steps, 630, 640 and 650. At step 630, one of the commands in the waiting queue that does not have an execution metric is selected. At step 640, the execution metric for the command is calculated as discussed above in FIG. 6-1 and as descried further below. At step 650, a check is performed to determine if there are additional commands in the waiting queue that do not have execution metrics. If there are commands in the waiting queue that do not have execution metrics, the system returns to step 630 and repeats the process until all of the commands in the waiting queue have an execution metric. If all of the commands in the waiting queue have an execution metric, the method continues with steps 610 and 620 as described.

Figure 7:
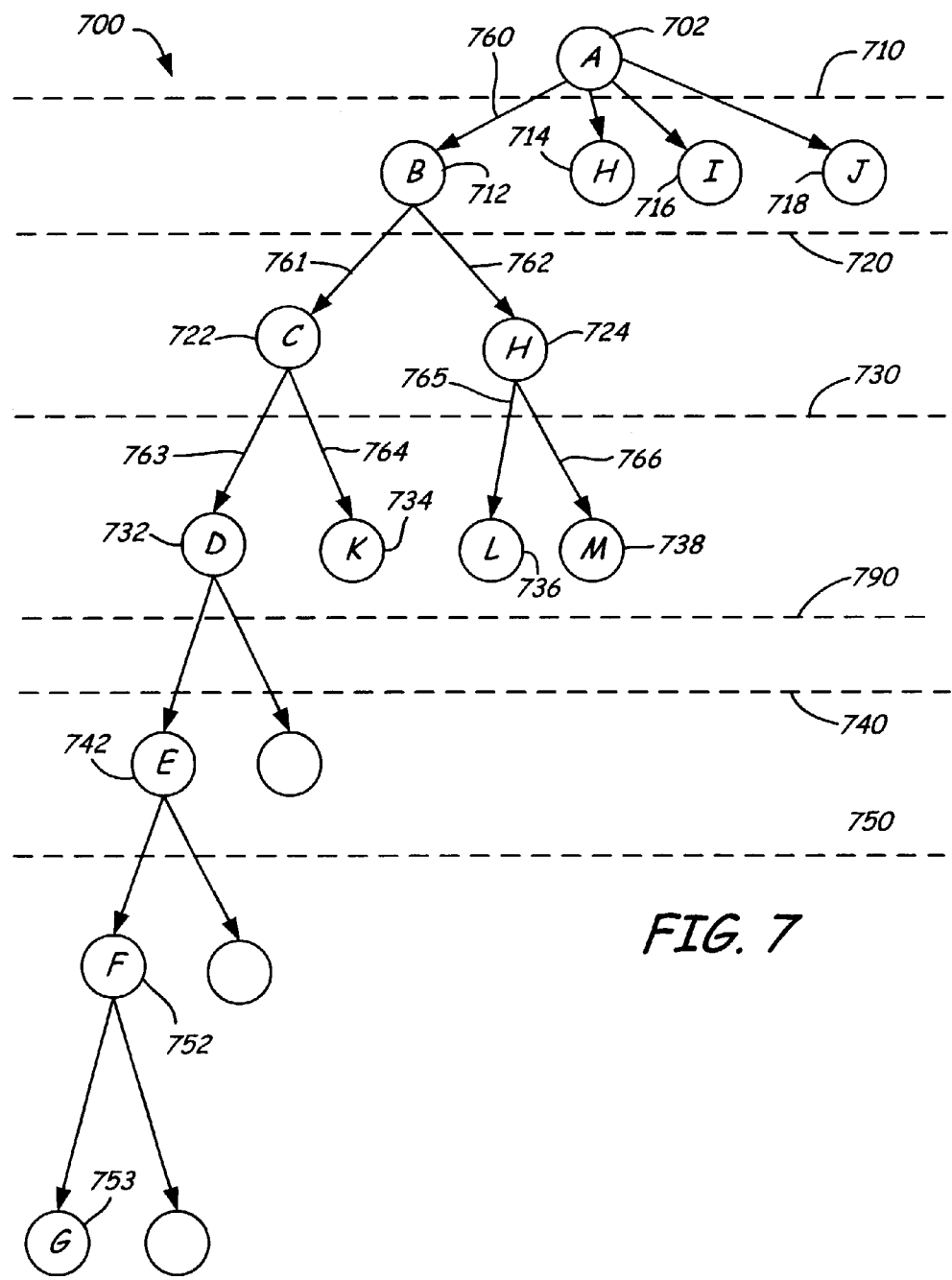
FIG. 7 is a diagrammatic illustration of a command execution tree, illustrating command execution paths upon which command scheduling decision can be based.

FIG. 7 is a diagrammatic illustration of an execution command path tree 700 which illustrates a manner in which execution metrics can be calculated in example embodiments of the methods of the present invention. Head command A 702 of execution command path tree 700 represents the command currently at the end of ready queue 230. As described above, like conventional methods, the methods of the present invention take into consideration access times between head command A 702 and various commands in the waiting queue 220 when determining which command should next be moved from the waiting queue to the ready queue. Thus, a first level 710 of commands branch off of head command 702, representing a first number of (four in the illustrated embodiment) of commands with shortest access times relative to the end of head command A 702. In this particular example, first level 710 includes commands B 712, H 714, I 716 and J 718, representing the four commands with shortest access times relative to head command A 702.

It should be noted that, while first level 710 is shown to include four commands, the number of commands in first level 710 can be different than four. For example, if sufficient processing resources are available, first level 710 could include every command in the waiting queue. However, given current processing capabilities, in many embodiments the optimal number of commands in first level 710 (and in other lower levels as well) will be less than the total number of commands in the waiting queue.

Command B 712 represents the command in waiting queue 220 with the shortest access time from the end of head command A 702. Commands H 714, I 716 and J 718 represent commands in waiting queue 220 having the second, third and fourth shortest access times from the end of head command 702. As described above, in accordance with embodiments of the present invention, the selection of which command to next move from the waiting queue to the ready queue is not dependent solely upon the rotation access times between commands in the waiting queue and the head command A 702, but instead is also dependent upon at least one access time between the particular command in the waiting queue and another command in the waiting queue. Thus, in illustrations of methods of the present invention, at least a second level 720 of command branches will be created. This can be referred to as tree depth.

Second level 720 contains, for each particular one of the commands in first level 710, a second number of commands from the waiting queue which have the shortest access times relative to the end of that particular command. For example, in one particular embodiment, second command level 720 has a width of two (as compared to the width of four in the illustrative embodiment of level 710). In the illustrative embodiment, each of the commands in first level 710 will thus have two commands in level 720 identified as having the shortest access times relative to that particular command in first level 710. For example, in FIG. 7 commands C 722 and H 724 have the shortest access times relative to the end of command B 712. This represents two possible command execution paths identifiable at this second level. A first path, identified by arrows 760 and 761, is from head command A 702 to command B 712 and then to command C 722. A second path, represented by arrows 760 and 762, extends from head command A 702 to command B 712 and then to command H 724. Other numbers of commands (i.e. a width other than two) can be used in second level 720. This would of course result in additional numbers of command execution pathways. Commands H 714, I 716 and J 718 would have similar branches extending off of them in second level 720, but for purposes of clarity only branches from command B712 are shown in FIG. 7.

Command C 722 in FIG. 7 represents the command in the waiting queue having the shortest access time from the end of command B 712. Command H 724 represents the command in the waiting queue having the second shortest access time from the end of command B 712. It should be noted that a command can appear more than once in the execution command path tree 700. For example, in FIG. 7, command H is shown at 714 and 724. However, the same command cannot appear more than once in the same chain or potential path.

In some embodiments, the methods of the present invention can stop at second level 720 when analyzing which of the commands in first level 710 should next be scheduled for execution (moved to the ready queue 230). The determination of which of the commands in first level 710 to move to the ready queue can be made based upon calculated execution metrics for each potential path. For example, if the analysis were to stop at second level 720, command B 712 would have two associated execution metrics, one determined based in part upon the access time between command B 712 and command C 722, and the other based in part upon the access time between command B 712 and command H 724. Both execution metrics would be a function of the access time between head command A 702 and command B 712 as well. The execution metrics can be determined in any variety of ways, including adding the various access times for each path together. In some advantageous embodiments described below, a tree depth level weighting factor is also considered in determining the execution metrics.

Referring back to the example shown in FIG. 7, in many embodiments the depth of execution command path tree 700 will extend at least to a third level 730, and possibly beyond. As illustrated in third level 730 of command path tree 700, commands D 732 and K 734 have the shortest access times from the end of command C 722, and are thus included as pathways as is shown using arrows 763 and 764. Commands L 736 and M 738 have the shortest access times relative to command H 724, and are thus included as potential pathways as is illustrated by arrows 765 and 766. At this third level, command B 712 will have four associated execution metrics (represented by 760/761/763; 760/761/764; 760/762/765; and 760/762/766). The further the depth of the tree used to calculate the execution metrics, the higher the number of execution metrics associated with each command in first level 710.

Line 790 represents the bottom depth level that the execution command path tree 700 extends to. In some embodiments, the depth of level 790 (i.e., the total number of levels in tree 700) is determined as a function of the number of commands in waiting queue 220. For example, in one embodiments, if the queue depth of waiting queue 220 is less than eight, the bottom depth level 790 stops at the third depth level 730. However, if the depth of waiting queue 220 exceeds eight, the bottom depth stops at a lower depth level, for example fourth level 740 or fifth depth level 750. These queue depth-execution command path tree depth dependencies are illustrative of example embodiments of the present invention, but do not limit the present invention to any particular queue and/or tree depths. It should also be noted that, in these embodiments, bottom level 790 need not be fixed at a particular level, but may be allowed to fluctuate depending upon the state of the queues or the processing power available to calculate the access times and/or the execution metrics.

As discussed above, a variety of methods can be used to calculate the execution metrics for each first level command in the waiting queue which is being considered for execution scheduling (movement to the ready queue). In all embodiments, each execution metric associated with a first level command is calculated not only as a function of the access time between that command and the head command (last command in the ready queue), but also as a function of at least one access time between that particular first level command and another command in the waiting queue. If has been discovered that, by placing a higher emphasis on commands which are closer to execution, the efficiency of the scheduling methods of the present invention can be further optimized. Therefore, in some embodiments of the present invention, the access times between various commands in the waiting queue are multiplied by a weighting factor which is dependent upon the depth levels at which the particular access times are being considered. Table 2 illustrates one example of weighting factors which can be used in accordance with some embodiments of the present invention.

TABLE 2

| Depth level | Queue Depth >= 8 commands Weighting factor | Queue Depth = 4 to 7 commands Weighting factor |
|---|---|---|
| 0 | 1000 | 100 |
| 1 | 830 | 87 |
| 2 | 688 | 73 |
| 3 | 571 | 45 |
| 4 | 473 | |
| 5 | 392 | |

The algorithm according to one embodiment of the present invention calculates the weighted access time of each command (between commands) at the first depth level 710 by multiplying the command's access time by the associated weighting factor in Table 2. For example, assuming a queue depth of eight, the weighting factor for command 712 would be 1000, which would be multiplied against the access time between command A 702 and command B 712. Then the algorithm multiplies the access times of command 712 child commands 722 and 724 (i.e., the access times between command B 712 and each of commands C 722 and H 724) by the weighting factor for the next depth level 720, which is 830. This process continues until the weighted access times for all of the child commands (including grandchild commands, great-grandchild commands, etc.) of the parent have been calculated. Then, the algorithm adds the weighted access times for each command path to determine the execution metric for the particular first level command. For example, a command path extending from command A 702 to command G 753 (i.e., a command path of A/B/C/D/E/F/G) can have an execution path metric pm[ABCDEFG] calculated as shown in Equation 1:

$$pm[ABCDEFG]=(W0*tAB)+(W1*tBC)+(W2*tCD)+(W3*tDE)+(W4*tEF)+(W5*tFG) \quad \text{Equation 1}$$

Where,

W0 through W5 are the access time weights for each level; and tAB through tFG are the access times between the commands in the path.

Once all of the path execution metrics for the commands at the first depth level 710 have been calculated, the algorithm selects the command in the first level having the smallest metric as the command to move from waiting queue to ready queue. However, those skilled in the art will realize that the calculation of weighted access time can be performed using other operations, such as calculating the weighted access times by division.

Figure 8A:
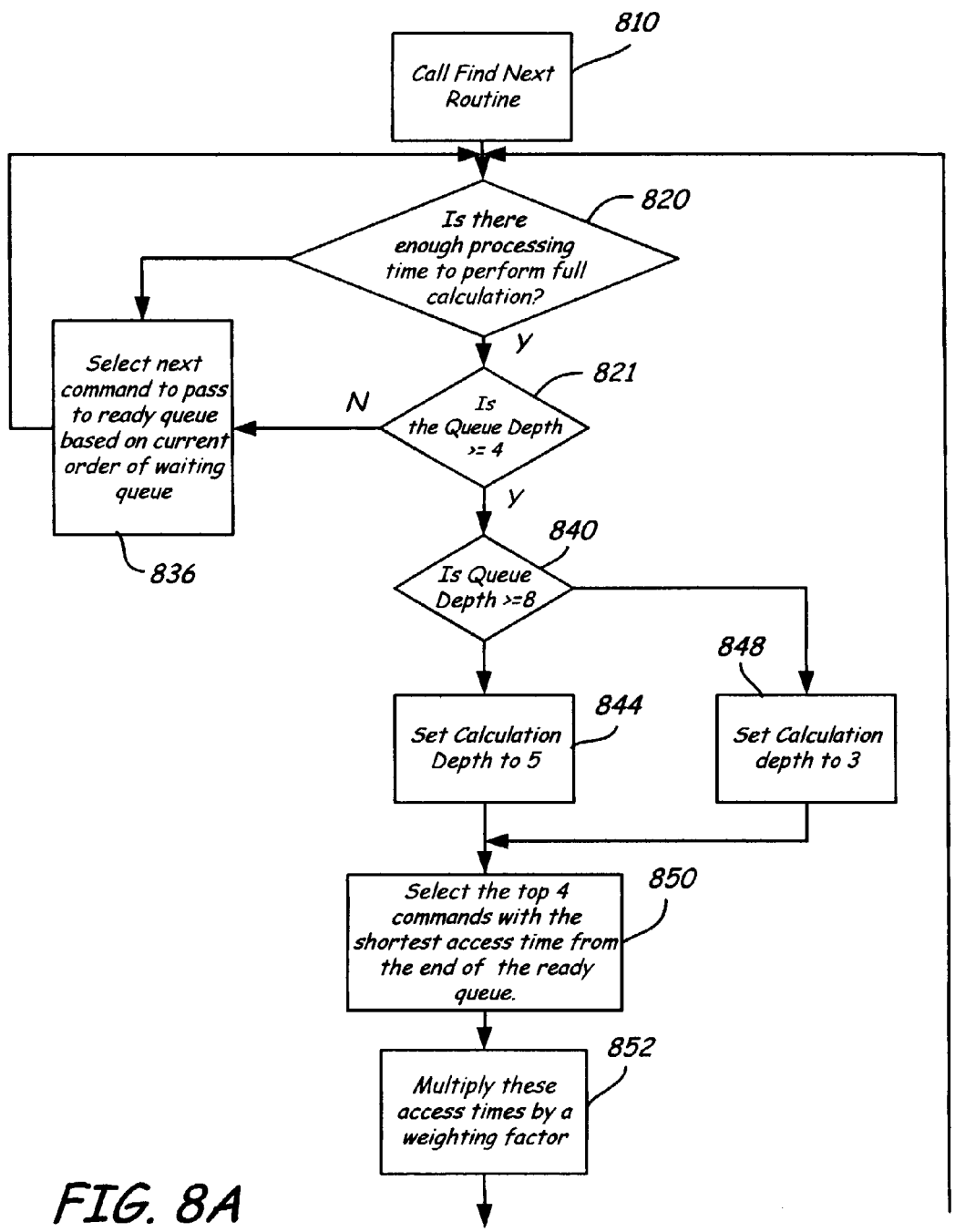
FIGS. 8–10 are flow diagrams illustrating methods of the present invention.
Figure 8B:
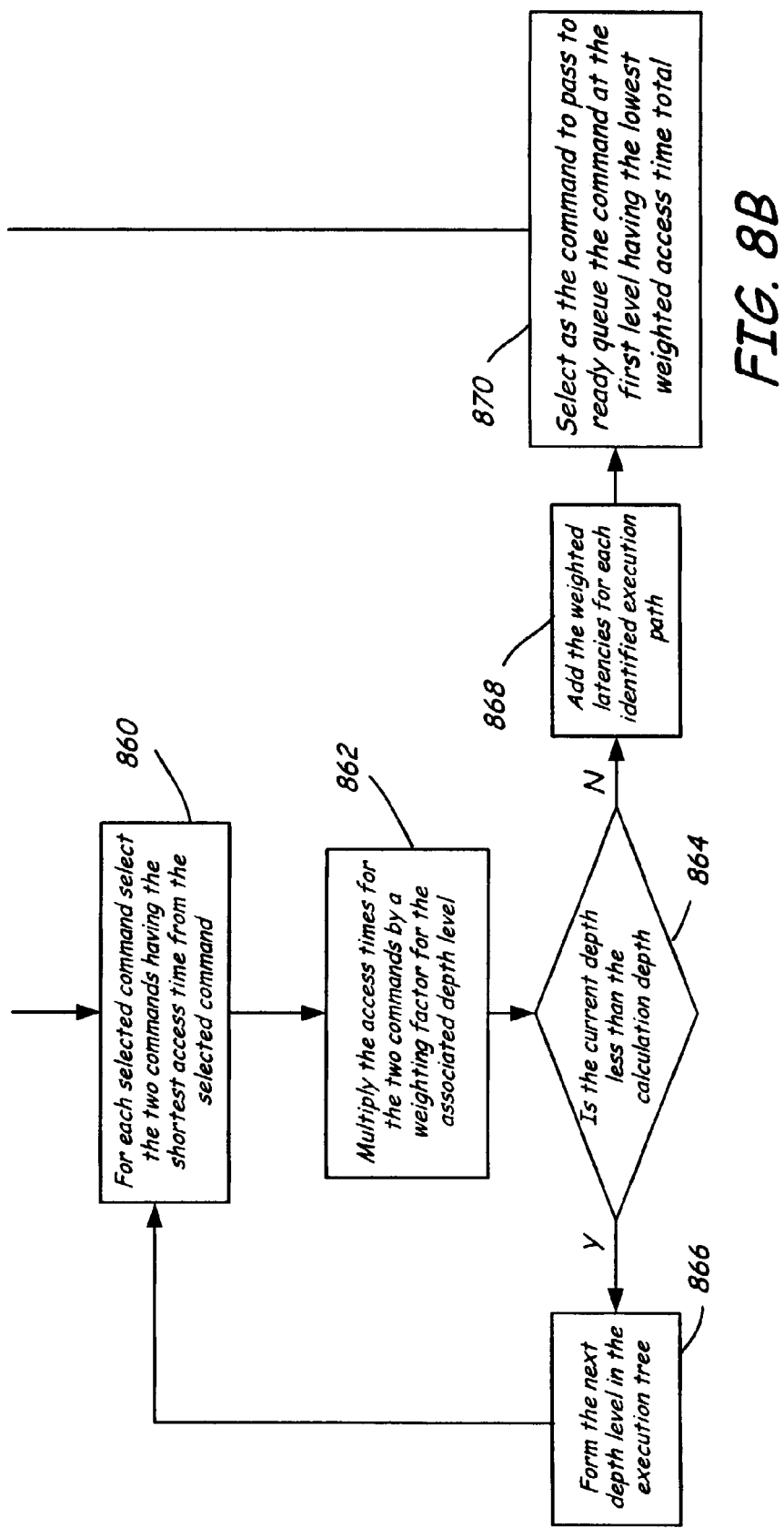

FIG. 8 is a flow diagram illustrating the steps for determining the next command to pass to the ready queue according to one more specific embodiment of the present invention. The process illustrated in FIG. 8 is similar to the arrangement illustrated in FIG. 7, and reference numbers used in FIG. 8 are the same as reference numbers used in FIG. 7 identify the same or similar features.

At step 810, the disc firmware or other controller circuitry calls a "Find Next Command" routine. At 820, the Find Next command routine determines if there is enough processing time to execute a deep queue calculation. This time can be a function of the number of commands in the ready queue versus the number of commands in the waiting queue. However, other methods of determining if there is enough time to perform the calculation, such as determining the accessing time required for the commands in the ready queue and comparing that time against a known calculation time, can be used.

If the routine determines there is enough time to perform a full calculation, the routine determines if there is a queue depth of at least four at step 830. A queue depth is determined by identifying the number of commands currently in the waiting queue. If either the queue depth is less than four or the routine determines that there is not enough time to perform a deep queue calculation, the routine selects a next command to execute using a selection algorithm as shown at step 836. This selection algorithm can be a prior art selection algorithm, such as a normal RPS algorithm, and can include selecting the first command in the waiting queue. However, depending on if the routine has been previously executed, the selection algorithm can choose as the next command the next command in a previously selected execution command path tree.

If the answer to both step 820 and step 830 is positive, the routine at step 840, determines if the queue depth is equal to or exceeds eight (or other predetermined queue depths). If the depth exceeds eight, a calculation depth is set to five at step 844. If the queue depth is less than eight, the calculation depth is set to three at step 848.

After the selection of the calculation depth, the routine identifies at step 850 four commands in the waiting queue with the shortest access times from the end of the last command in the ready queue. Further, at step 852, the access times of the four identified commands are multiplied by the appropriate weighting factor, such as the ones shown in Table 2, above. At step 860, for each of the four identified commands, the routine selects as a next potential command two commands having the shortest access times from the end of the identified command. Then, the access times of the two selected commands are multiplied by the weighting factor for the second depth in Table 2, at step 862. Following the calculation of the weighted access times at the second level of depth, the system continues to determine, for each selected command at the previous depth level, the two commands having the shortest and second shortest access times to the selected command. This requires execution of the steps shown at 864 and 866, and repeating steps 860 and 862. The access time of the two newly selected commands is multiplied by the related weighting factor for the associated depth as shown in Table 2. The process continues until the calculation depth is reached. Once the calculation depth is reached, the system adds the weighted access time for each execution command path identified at step 868. At step 870, the system selects as the next command to execute the first level command of the execution path having the lowest weighted total, and passes the selected command to the ready queue. Some disc drive implementations require consideration of whether a potentially recommended candidate is restricted in its ability to be promoted ahead of other commands in the waiting queue. For instance, some implementations must give consideration to data hazards when reordering the execution of commands. An example of a data hazard would be when two write commands are attempting to write to the same block and changing the order of execution of these commands would likely result in different data remaining on the disc. If the potentially recommended command is restricted due to protocol limitations of a particular disk drive implementation, then step 870 might instead consider the second, third, fourth, etc. best candidate until a candidate is found that is not restricted.

Figure 9:
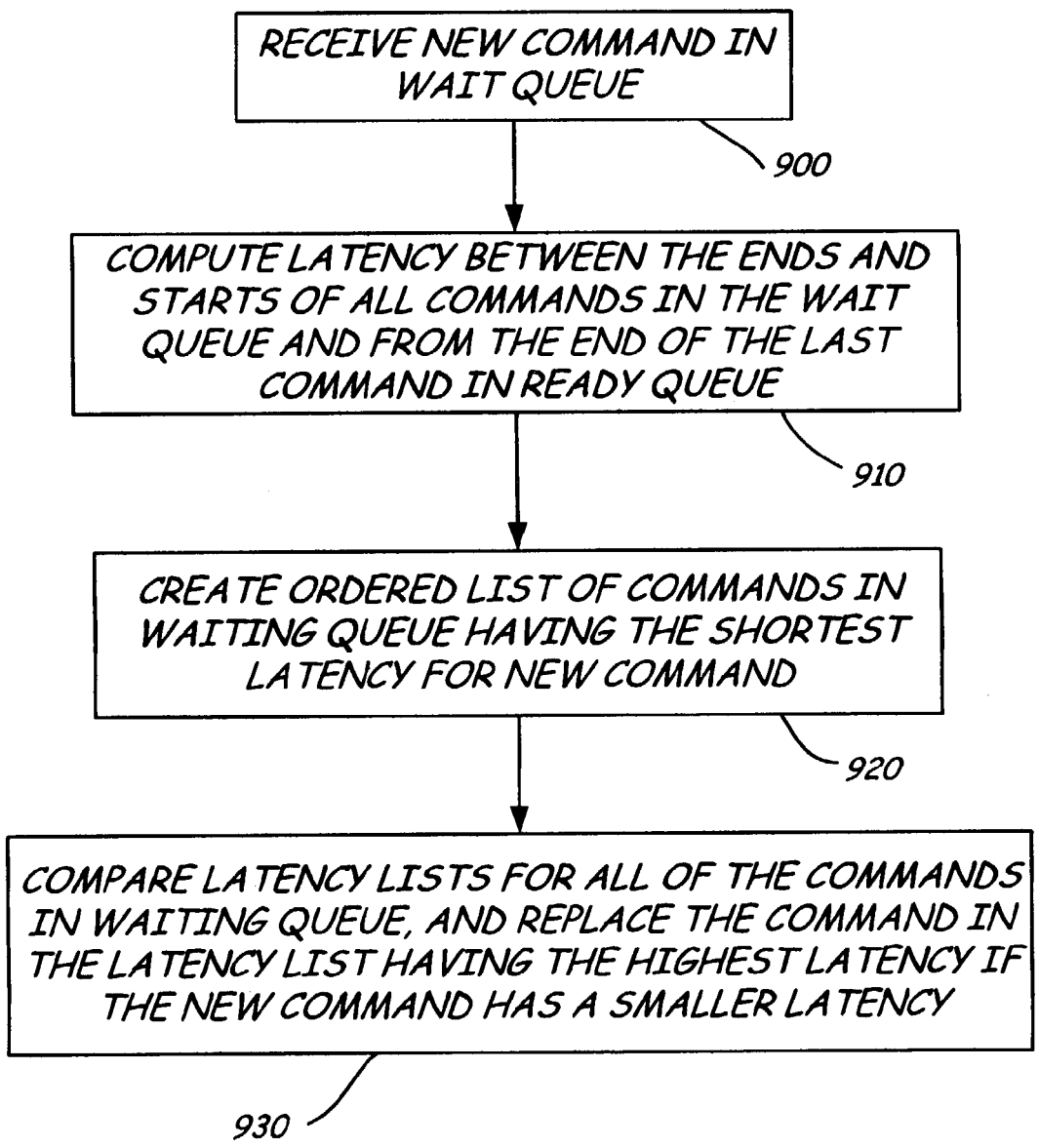

FIG. 9 is a flow diagram illustrating the steps executed by the system when a new command is provided to the wait queue. At step 900, a new command is received by the wait queue. At step 910, the system computes the access time between the ends and starts for all of the commands in the wait queue and the last command in the ready queue. The results of the access time calculation is stored in a table, such as the one shown in Table 1. The system maintains, for each command in the wait queue, an ordered list of other commands having the shortest access times to the command. At step 920 the system creates a list of ordered commands in the waiting queue that have the shortest access time to the newly entered command. At 930 the system compares the access time between the new command and each command in the waiting queue. If the new command is determined to have a shorter access time than any command currently in the list of shortest access times, the system replaces the command in the list having the greatest access time with the new command. The system repeats this process until all of the commands in the wait queue have been compared.

Figure 10:
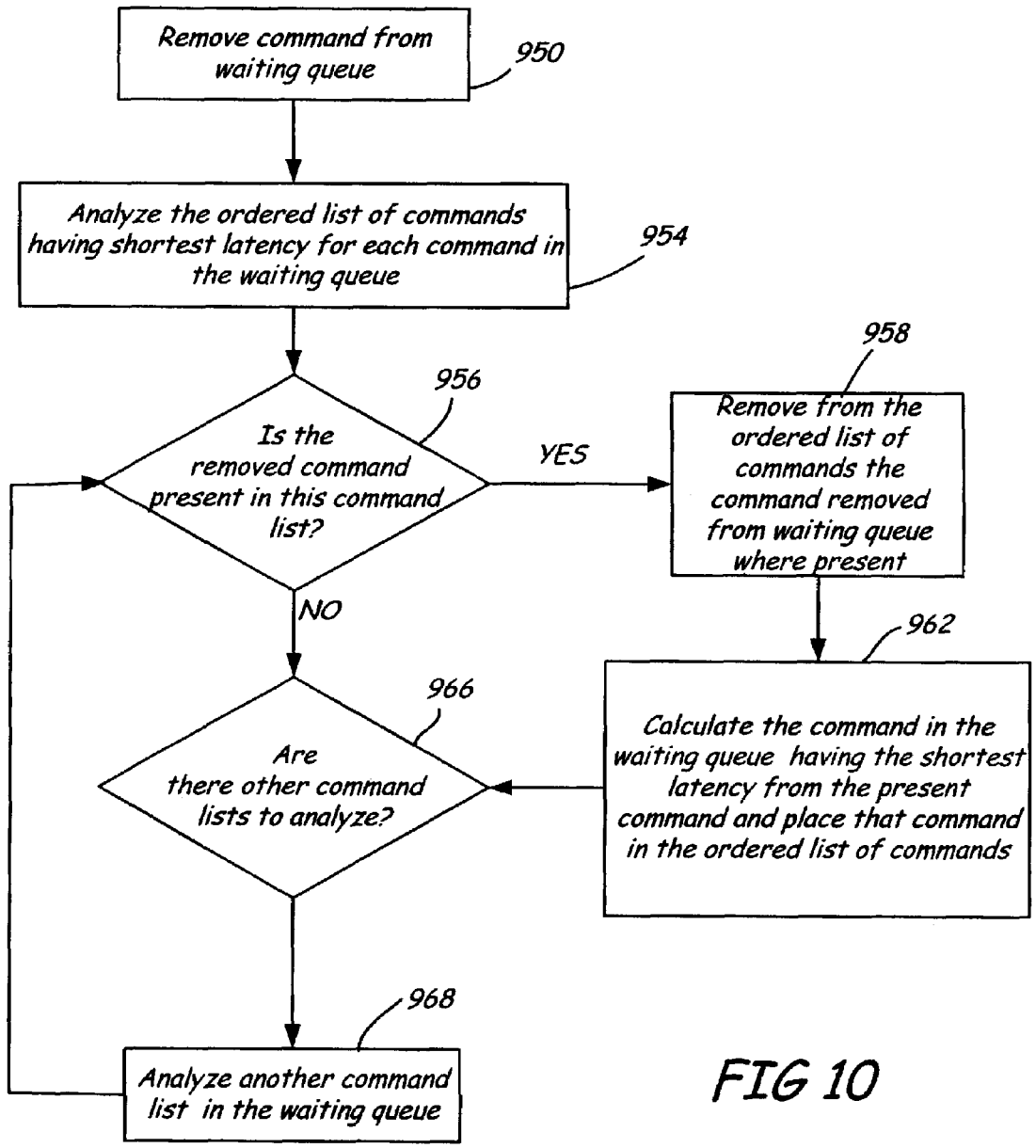

FIG. 10 illustrates the steps for updating the table of lists developed as described in FIG. 9 when a command is removed from the wait queue. At step 950 a command is removed. The command can be removed from the wait queue by either having the command passed to the ready queue, or by having the command cancelled. Other methods of removing the command can be used. At step 954 the system analyzes the list of seven commands for each of the remaining commands in the wait queue. The system then determines if the command was removed from the list of closest commands at step 956. If the removed command was in the list of commands for a selected command, the removed (from the waiting queue) command is required from the list at step 958. At step 962, the system analyzes the remaining commands and identifies a command in the wait queue that has the shortest access time from the end of the selected command that is not currently in the list. The system then places that command in the list of commands for the selected command. At step 966, the system checks to see if any more command list need to be analyzed. If there are more command lists to be analyzed, the system returns to step 956, and repeats steps 958, 962, and 966 after executing return step 968.

In summary, the present invention includes a method of determining an order of execution of a plurality of queued commands in a rotating disc drive. Embodiments of the method are illustrated for example in FIGS. 5, 6-1, 6-2 and FIG. 8. In an exemplary embodiment, the method includes the step 600 of determining a plurality of execution path metrics, with each of the plurality of execution path metrics being associated with one of a plurality of commands in a waiting queue. Each of the plurality of execution path metrics is determined both as a function of an access time between a last command in a ready queue and the associated one of the plurality of commands in the waiting queue, and as a function of an access time between the associated one of the plurality of commands in the waiting queue and another of the plurality of commands in the waiting queue.

The method also includes the step 610 of selecting one of the plurality of commands in the waiting queue based upon the determined execution path metrics, and a step 620 of moving the selected one of the plurality of commands in the waiting queue to the ready queue.

In some embodiments, the step 600 of determining the execution path metrics further comprises the steps of identifying a plurality of potential paths through the plurality of commands in the waiting queue, and calculating a different execution path metric for each potential path through the plurality of commands in the waiting queue.

In some embodiments, the step 600 of determining the execution path metrics further comprises identifying the plurality of potential paths by performing the steps of selecting a first number of first level commands in the waiting queue with shortest access times from the last command in the ready queue, and identifying as the plurality of potential paths through the plurality of commands in the waiting queue only paths which pass directly from the last command in the ready queue to one of the selected first level commands in the waiting queue.

In some embodiments, for each particular one of the selected first level commands in the waiting queue, identifying the plurality of potential paths further comprises selecting a second number of second level commands in the waiting queue with shortest access times from the particular one of the selected first level commands in the waiting queue; and identifying as potential paths through the plurality of commands in the waiting queue those paths which pass directly from the particular one of the selected first level commands in the waiting queue to one of the selected second number of commands in the waiting queue.

The present invention also includes a disc drive 100 having at least one storage disc 106 provides at least one media surface 107 upon which a plurality of commands can be executed. A controller 205 of the disc drive provides a waiting queue 220 and a ready queue 230. The controller 205 receives commands from a host computer 210 and stores the received commands in the waiting queue. The controller executes commands from the ready queue. The controller is configured to perform the above described execution order determining steps.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the disc drive, while maintaining substantially the same functionality without departing from the scope and spirit of the present invention.

What is claimed is:

1. A method of determining an order of execution of a plurality of queued commands, the method comprising the steps of:
   (A) determining a plurality of execution path metrics, each of the plurality of execution path metrics being determined both as a function of an access time between an associated one of a plurality of commands in a waiting queue and another of the plurality of commands in the waiting queue, and as a function of an access time between a last command in a ready queue and the associated one of the plurality of commands in the waiting queue, wherein step (A) of determining the plurality of execution path metrics further comprises the steps of:
      (A)(1) identifying a plurality of potential paths through the plurality of commands in the waiting queue, wherein step (A)(1) comprises:
         (A)(1)(i) selecting a first number of first level commands in the waiting queue with shortest access times from the last command in the ready queue, wherein the first number of the selected first level commands in the waiting queue is less than a total number of commands in the waiting queue; and (A)(1)(ii) identifying as the plurality of potential paths through the plurality of commands in the wailing queue only paths which pass directly from the last command in the ready queue to one or the selected first level commands in the waiting queue; and (A)(2) calculating a different execution path metric for each potential path through the plurality or commands in the waiting queue;

(B) selecting one of the plurality of commands in the waiting queue based upon the determined plurality of execution path metrics; and (C) moving the selected one of the plurality of commands in the waiting queue to a ready queue.

2. The method of claim 1, wherein for each particular one of the selected first level commands in the waiting queue the step (A)(1) of identifying the plurality of potential paths further comprises the steps of:

(A)(1)(iii) selecting a second number of second level commands in the waiting queue with shortest access times from the particular one of the selected first level commands in the waiting queue; and (A)(1)(iv) identifying as potential pats through the plurality of commands in the waiting queue those paths which pass directly from the particular one of the selected first level commands in the waiting queue to one of the selected second number of commands in the waiting queue.

3. The method of claim 2, wherein step (A)(2) of calculating the different execution path metric for each potential path further comprises the step (A)(2)(i) of calculating each particular execution path metric as a function of an access time between the last command in the ready queue and the first level command of the particular execution path metric, and as a function of an access time between the first level command and the second level command of the particular execution path metric.

4. The method of claim 3, wherein step (A)(2)(i) of calculating each particular execution pat metric further comprises the steps of:

(A)(2)(i)(a) multiplying each access time corresponding to the particular execution path by one of a plurality of weighting factors to obtain a plurality of weighted access tunes for the particular execution path; and (A)(2)(i)(b) calculating the particular execution path metric as a function of the weighted access times for the particular execution path.

5. The method of claim 4, wherein step (A)(2)(i)(a) of multiplying each access time corresponding to the particular execution path by one of the plurality of weighting factors further comprises multiplying each access time corresponding to the particular execution path by a weighting factor determined as a function of a command level of the corresponding command.

6. The method of claim 5, wherein the weighting factors corresponding to each command level are such that weighting factors corresponding to higher level commands are greater than weighting factors corresponding to lower level commands.

7. The method of claim 5, wherein step (B) of selecting one of the plurality of commands in the waiting queue further comprises selecting the first level command having the smallest execution path metric.

8. A data storage system having a plurality of queued commands, the data storage system comprising:

at least one storage media on which a plurality of commands can be executed;

a controller having a waiting queue and a ready queue, the controller storing received commands in a waiting queue and executing commands from a ready queue, wherein the controller is configured to perform the execution order determining steps of:

(A) determining a plurality of execution path metrics, each of the plurality of execution path metrics being determined both as a function of an access time between an associated one of the plurality of commands in the waiting queue and another of the plurality of commands in the waiting queue, and as a function of an access time between a last command in a ready queue and the associated one of the plurality of commands in the waiting queue, wherein step (A) comprises:

(A)(1) identifying a plurality of potential paths through the plurality of commands in the waiting queue, wherein step (A)(1) comprises:

(A)(1)(i) selecting a first number of first level commands in the waiting queue with shortest access times from the last command in the ready queue:

(A)(1)(ii) identifying as the plurality of potential paths through the plurality of commands in the waiting queue only oaths which pass directly from the last command in the ready queue to one of the selected first level commands in the waiting queue:

(A)(1)(iii) selecting a second number of second level commands in the waiting queue with shortest access times from the particular one of the selected first level commands in the waiting queue: and (A)(1)(iv) identifying as potential paths through the plurality of commands in the waiting queue those paths which pass directly from the particular one of the selected first level commands in the waiting queue to one of the selected second number of commands in the waiting queue; and (A)(2) calculating a different execution path metric for each potential path through the plurality of commands in the waiting queue as a function of an access time between the last command in the ready queue and the first level command of the particular execution path metric, and as a function of an access time between the first level command and the second level command of the particular execution path metric, wherein step (A)(2) of calculating each particular execution path metric further comprises the steps of:

(A)(2)(i) multiplying each access time corresponding to the particular execution path by one of a plurality of weighting factors to obtain a plurality of weighted access times for the particular execution path; and (A)(2)(ii) calculating the particular execution path metric as a function of the weighted access times for the particular execution path;

(B) selecting one of the plurality of commands in the waiting queue based upon the determined plurality of execution path metrics; and (C) moving the selected one of the plurality of commands in the waiting queue to the ready queue.

9. The data storage system of claim 8, wherein step (A)(2)(i) of multiplying each access time corresponding to the particular execution path by one of the plurality of weighting factors further comprises multiplying each access time corresponding to the particular execution path by a weighting factor determined as a function of a command level of the corresponding command.

10. The data storage system of claim 9, wherein the weighting factors corresponding to each command level are such that weighting factors corresponding to higher level commands are greater than weighting factors corresponding to lower level commands.

11. The data storage system of claim 10, wherein step (B) of selecting one of the plurality of commands in the waiting queue further comprises selecting the first level command having the smallest execution path metric.

12. A disc drive including the data storage system of claim 8.

* * * * *